(12) United States Patent
Guez et al.

(10) Patent No.: US 7,548,164 B2
(45) Date of Patent: Jun. 16, 2009

(54) MEANS TO DEACTIVATE A CONTACTLESS DEVICE

(75) Inventors: Gregory Guez, Marseilles (FR); Colin Bates, Lanark (GB)

(73) Assignee: Atmel Corporation, San Jose, CA (US)

( * ) Notice: Subject to any disclaimer, the term of this patent is extended or adjusted under 35 U.S.C. 154(b) by 311 days.

(21) Appl. No.: 11/346,006

(22) Filed: Feb. 2, 2006

(65) Prior Publication Data

US 2007/0075140 A1    Apr. 5, 2007

(30) Foreign Application Priority Data

Oct. 4, 2005    (FR)    ................................ 05 10130

(51) Int. Cl.
*G08B 13/14* (2006.01)
(52) U.S. Cl. ............... 340/572.3; 340/572.1; 340/539.3
(58) Field of Classification Search .............. 340/572.1, 340/572.3, 572.7, 539.1, 539.11, 539.21, 340/539.23, 539.3, 10.1, 10.3, 10.51, 572.4; 235/472.01; 326/37, 102

See application file for complete search history.

(56) References Cited

U.S. PATENT DOCUMENTS

| 5,512,879 | A | 4/1996 | Stokes |
| 5,963,144 | A | 10/1999 | Kruest |
| 6,025,780 | A * | 2/2000 | Bowers et al. ............ 340/572.3 |
| 6,147,605 | A | 11/2000 | Vega et al. ................ 340/572.7 |
| 6,476,708 | B1 | 11/2002 | Johnson .................... 340/10.34 |
| 6,650,227 | B1 | 11/2003 | Bradin |
| 6,690,264 | B2 | 2/2004 | Dalglish |
| 6,717,923 | B1 | 4/2004 | Smith |
| 6,726,106 | B1 * | 4/2004 | Han et al. ............... 235/472.01 |
| 6,876,226 | B2 * | 4/2005 | Buchmann et al. ............. 326/37 |

FOREIGN PATENT DOCUMENTS

| EP | 1 538 556 A1 | 6/2005 |
| WO | WO 97/22085 A1 | 6/1997 |
| WO | WO 99/05658 A1 | 2/1999 |

* cited by examiner

*Primary Examiner*—Van T. Trieu
(74) *Attorney, Agent, or Firm*—Schwegman, Lundberg & Woessner P.A.

(57) ABSTRACT

A method and apparatus for deactivating an identification device or RFID tag, such as an e-passport or an ID card that has been revoked, has expired, or is invalid. A programmable memory circuit is coupled to a controlling circuit that is coupled to a shorting circuit that may activate or deactivate the operation of the identification device.

27 Claims, 3 Drawing Sheets

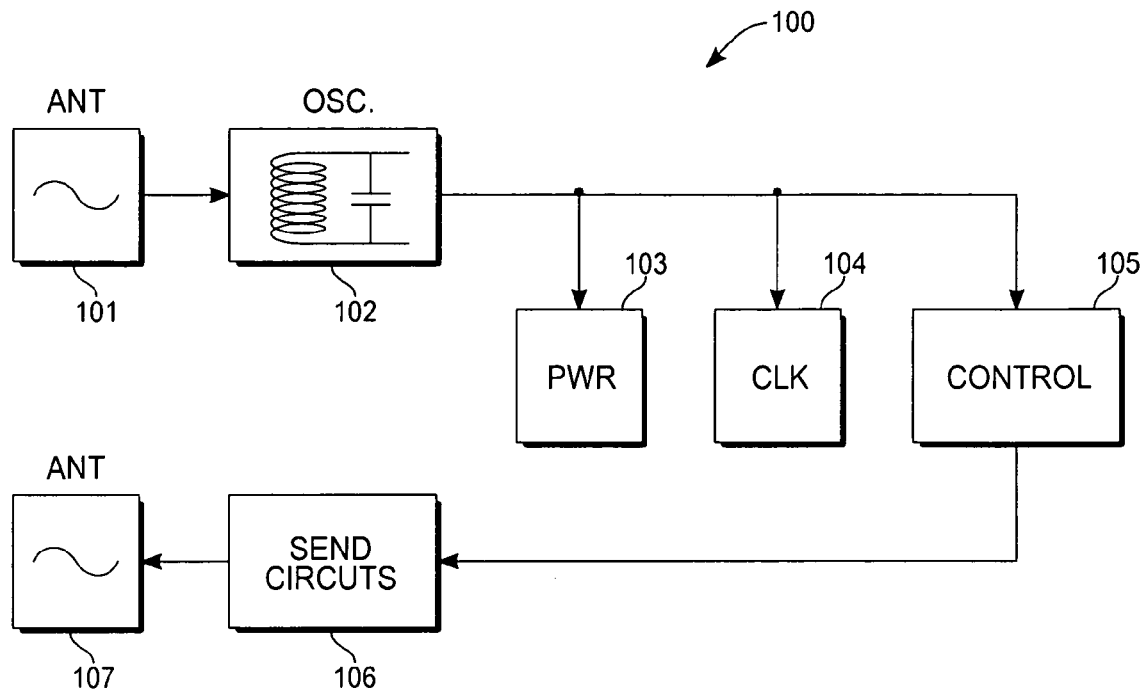
Fig. _ 1
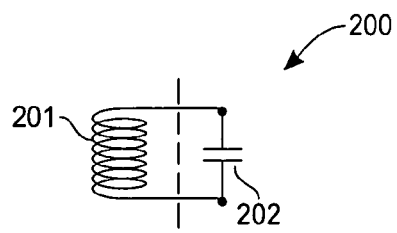
Fig. _ 2A
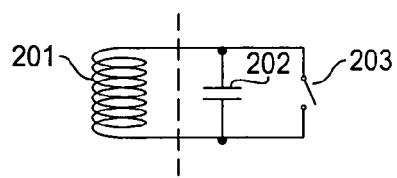
Fig. _ 2B

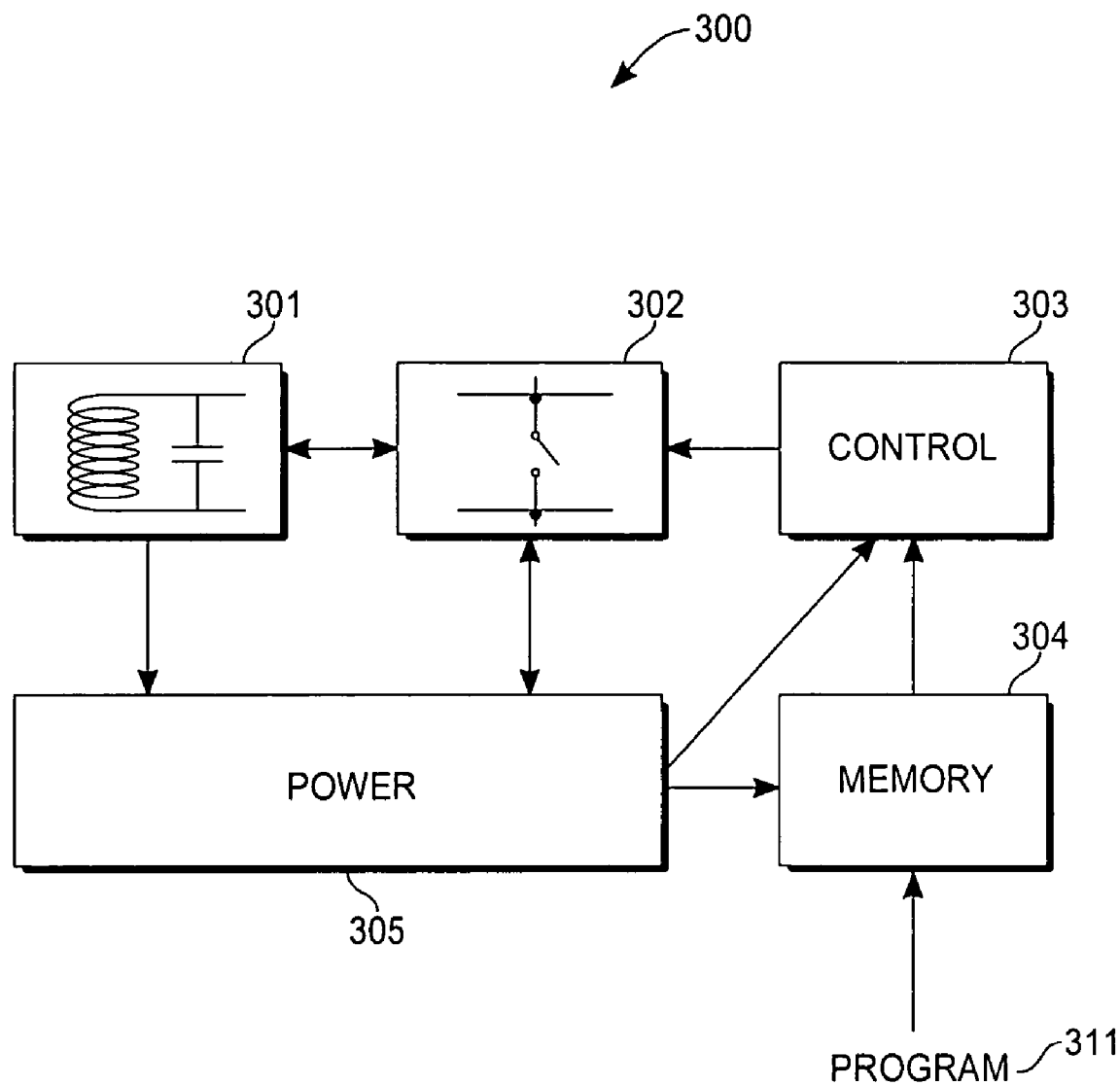
Fig._ 3

MEANS TO DEACTIVATE A CONTACTLESS DEVICE

TECHNICAL FIELD

The present invention generally relates to identification devices, systems, and methods used to access or authenticate data within an electronic device or electronic document by means of a radio frequency identification device (RFID) or other identification device such as a "smart card."

BACKGROUND

Automatic identification technology is used to help identify persons or objects and automatically provide data relating to the persons or objects. Typically, authenticated or certified documents are presented as a basis for granting services or benefits to an individual, for example when using passports or visas from state, local, and federal government agencies. RFID tags or embedded devices may be used to certify legal documents or to assure that a document is not counterfeit such as the Common Access Card (CAC) used by the U.S. Department of Defense.

One early technology was the bar code serial number system. However, a bar code cannot store detailed information that relates to an individual person or item, such as an expiration date (for example, on a food item or a passport visa). Another identification technology, including RFID devices, RFID circuits, and RFID tags, is presently manufactured and used to track a variety of items and materials. RFID devices are also used to track transactions when they are embedded in, for example, credit cards. Contactless smart card technology is used in applications that need to protect personal information and/or deliver secure transactions, such as transit fare payment cards, government and corporate identification cards, electronic passports and visas, and financial payment cards. Contactless smart card technology is available in a variety of forms as plastic cards, watches, key fobs, documents, and other handheld devices, for example, built into mobile phones or personal digital assistants.

Emerging RFID technology employs a radio frequency (RF) wireless or contactless link and an RFID device may include an embedded computer chip. RFID technology allows persons or objects to be identified and allows detailed information to be stored within an individual RFID device. For example, an implementation may include a secure microcontroller embedded in a page or cover of an e-passport. Other examples include driver's licenses, birth certificates, and marriage certificates. The owner's personal information, such as an encoded cryptographically signed copy of a photograph, signature, fingerprints, and other biometrics data, may be securely stored in an RFID device. Communication with a machine-readable passport may be contactless. The ISO/IEC 14443 standard, which is currently applied in the credit card and payments industry, may be used in authorizing documents such as an e-passport. Generally, a variety of communication channels or frequencies may be used, depending on the data transfer rate requirements, and other factors.

An RFID may have a battery included in the device, or may be passive, having a contactless power source driven by a magnetic field from an RFID reader. Generally, an RFID device, having no batteries or power source of its own, relies on getting its power from an RFID reader's RF signal to operate. When the RFID device is brought into an electromagnetic field of the reader, the IC chip in the RFID device powers on. Once the IC chip is powered on, a wireless communication protocol is initiated and established between the card and the reader for data transfers. The new e-passports embed a type of smart card technology, which is not the same as simpler RFID tags being used to track products. An RFID tag will generally send only the ID number stored in the RFID tag. Contactless smart card technology, based on the ISO/IEC 14443 specification, powers on when a low power radio frequency signal of 13.56 MHz is applied within a few inches of the RFID device. Other frequencies may be used, for example, a 125 KHz channel, a 134 KHz channel, or using a 915 MHz carrier.

Smart card technology defines communication protocols, and the RFID device may receive commands and update the information stored in the RFID device. Encryption and security certifications are generally used in applications such as an e-passport to resist security attacks, and some applications require up to 10 years or more of error-free operation. If a contactless device is attached on an ID document, it generally remains operational for the entire life of the document. For example, an e-passport may contain several operational contactless RFID devices corresponding with visas for several countries. A single document requiring multiple certifications may contain several RFID devices. Currently, if a contactless RFID device is attached to a document, the RFID device remains active for the entire life of the document.

Referring to FIG. 1, a prior art RFID device 100 contains a receiving antenna element 101, an oscillator circuit 102, a power circuit 103, a clock circuit 104, a control circuit 105, and transmitting or send circuits 106 and a sending antenna 107. The oscillator circuit 102 may be comprised of RF matching passive components such as an inductor and capacitor. An alternating current (AC) signal, received on the antenna 101, is rectified by the power circuit 103 to produce a direct (DC) current source to provide a voltage source to power the other circuits in the RFID device 100. A clock (extraction) circuit 104 extracts a clock or timing signal that is used for clocking components and signals used by the RFID device 100. The control circuit 105 may control the send circuits 106 to send stored data (identification) information to an RFID reader (not shown). Other circuits contained in the RFID device 100 may include memory containing ID information, interface circuits, and transmission circuits. Generally, the circuits will read an identification number, identification code, or other information stored in the RFID device, and then transmit the stored ID information to the RFID reader.

U.S. Pat. No. 6,147,605 to Vega et al. entitled "Method And Apparatus For An Optimized Circuit For An Electrostatic Radio Frequency Identification Tag" discusses an oscillator to an RFID tag. However, Vega has a disadvantage of not being able to fully deactivate the device. U.S. Pat. No. 6,476,708 to Johnson entitled "Detection Of An RFID Device By An RF Reader Unit Operating In A Reduced Power State" discusses an excitation signal generator and an activation circuit in an RFID tag. A flip-flop switch toggles the RF transponder between a reduced and increased power state. However, Johnson suffers a disadvantage of having no means to permanently deactivate the device since the flip-flop state cannot be maintained without a power signal.

It is desirable to, for example, have a contactless device that may be disabled or deactivated, for example, a visa that is not valid or has expired in an e-passport.

SUMMARY

An exemplary embodiment of the present invention describes an RFID device having a shorting circuit driven by a logical state stored in a memory device. The stored logical state in the memory device determines whether power circuitry and/or antenna interface circuitry is enabled or disabled, correspondingly deactivating or activating the RFID device.

BRIEF DESCRIPTION OF THE DRAWINGS

FIG. 1 is a block diagram of prior art modulation control in an RFID device.

FIGS. 2A and 2B are schematic diagrams of exemplary antenna interface circuits or oscillation circuits in an RFID device.

FIG. 3 is a block diagram of an exemplary circuit to deactivate an RFID device.

DETAILED DESCRIPTION

Figure 4:
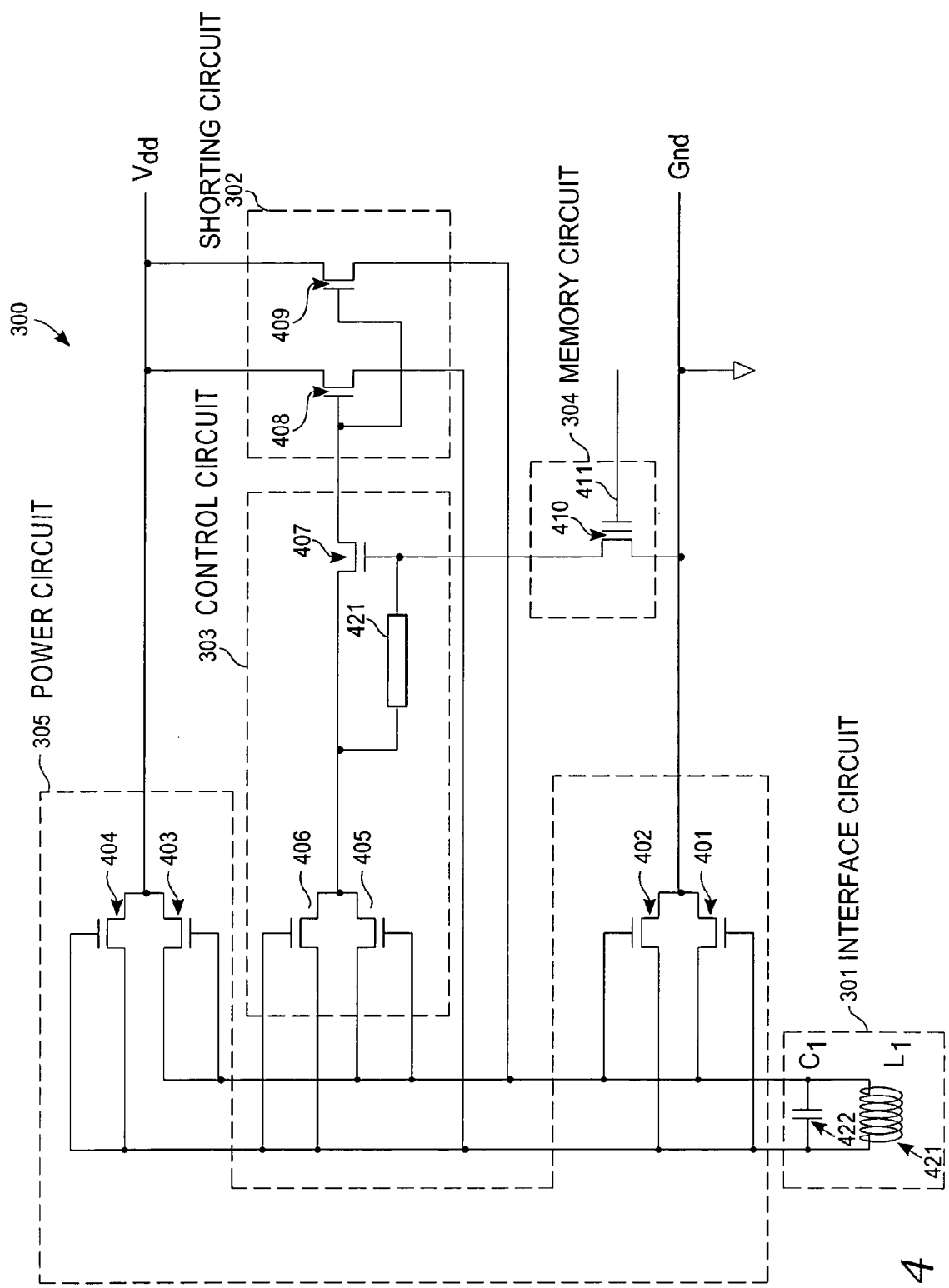
FIG. 4 is an exemplary circuit diagram of a device capable of deactivating an RFID device.

Presented is a method and a device or circuit to deactivate an invalid contactless identification device or deactivate an identification device. An identification device is enabled or disabled depending on the programmed state of an internal memory device. Depending on the application, it may be necessary to deactivate an identification device. Deactivation may be desirable so that, in future transactions, the contactless device will not disturb or confuse the reading of other contactless devices, or if an authorized period has expired. For example, for a passport that contains several visas (electronic identification devices), one visa may be expired. In this example, it may be desirable that only the expired visa be deactivated.

An RFID system may consist of two primary components, an RFID identifying device and an RFID reader. Generally, an RFID reader sends RF signals to an RFID device or tag using magnetic or electromagnetic fields to both power the card and to exchange data between the RFID device and the reader. When the RFID device or tag receives the reader's signal, the RFID tag or device sends stored data to the reader and the reader receives and decodes the data programmed into the RFID device or tag. Some passive RFID devices get all of their power from the reader signal, where the RFID devices are powered up only when in the vicinity of the electromagnetic fields of the reader.

The RFID device typically includes an integrated circuit (IC) chip and an antenna embedded within the RFID device. An RFID device may also reside within a key fob or within a document such as a passport. The IC chip may only include a simple number, similar to the amount of information in a bar code, a variety of detailed information such as a photograph and personal biometrics, or it may include a digital decoder to execute commands received from the reader. The IC chip within the RFID device may include a power supply circuit to extract and regulate power from the electromagnetic signal from a reader, a detector to decode signals from the reader, a transmitter to send data back to the reader, anti-collision protocol circuits, and at least enough memory to store an identification (ID) code.

The prior art RFID circuits in FIG. 1 lack the functionality to permanently disable the RFID device. For example, in the prior art, even if an RFID visa within a passport has expired, the RFID will generally need to be physically altered or destroyed to disable it from operating or functioning. Each time a prior art RFID device is within the vicinity of an RFID reader, the RFID device will power up and begin communicating with the reader. For applications such as e-passports, it may be necessary to deactivate specific RFID devices, or limit the number of active RFID devices in the e-passport. For example, for a passport that contains several RFID visas, a single visa may have expired or may be invalid. In this example, it may be desirable to deactivate or invalidate a visa to limit the travel activity of a known criminal. In other applications, such as an e-document application or for a document authorizing access to secure areas, it may be desirable to permanently deactivate an expired RFID device contained in the document.

Referring to FIG. 2A, a parallel resonant (LC) tank oscillation or antenna matching circuit is used as an interface circuit 200 to an antenna (not shown). Values of an inductor (L) 201 and capacitor (C) 202 are selected to provide a desired oscillating frequency or matching impedance. The inductance value may include a specific component or part coupled to an antenna, or the inductance value may be the inductive value of only the antenna. Other passive and active excitation, resonance, or oscillation circuits may also be used in the oscillator or matching circuit, including the use of diodes, transistors, frequency control circuits, and feedback or amplification devices. For the signal received at the antenna, a variety of modulation techniques may also be used including amplitude modulation, phase modulation, frequency modulation, or a combination of modulation techniques. A variety of frequencies may also be implemented.

Referring to FIG. 2B, in an exemplary embodiment of an RFID identifying device, the interface circuit 200 may be deactivated by shorting the oscillating, matching, or interface circuit using a switch or shorting circuit 203 that provides a low impedance or shorting impedance to the oscillating or matching circuit components (i.e., the inductor 201 and the capacitor 200). The shorting circuit 203 (or switch) is coupled in parallel with the oscillating or matching circuit components, discharging the oscillating AC energy transfers between the capacitor 202 and the inductor 201.

Referring to FIG. 3, in an exemplary block diagram of an RFID identifying device 300, an interface circuit 301 is coupled to a shorting circuit 302. The interface circuit 301 contains at least one component that oscillates or matches to an antenna (not shown). Generally, an LC circuit is used in the interface circuit 301. However, other components such as a matching transformer or active devices such as a diode or transistor may also be used. The shorting circuit 302 may be comprised of a single transistor switch, or multiple transistor switches. When the shorting circuit 302 is in a conducting mode of operation, it provides a shorting impedance or current path that damps or halts the transfer of energy between the components in the interface circuit 301 and the antenna. A control circuit 303 activates or deactivates the shorting circuit 302. The control circuit 303 is coupled to a memory circuit 304 that is programmed to store a pre-selected logic value. The programmed logic value determines whether the control circuit 303 activates or deactivates the shorting circuit 302, which deactivates or activates the interface circuit 301. A power circuit 305 provides a source of power to circuits in the RFID device. The source of power is derived from signals developed in the interface circuit 301. The signal developed in the interface circuit 301 is generally an electromagnetic wave generated by an RFID reader through the antenna.

Referring to FIG. 4, a specific exemplary embodiment of an RFID device 300 comprises an (antenna) interface circuit 301, a shorting circuit 302, a control circuit 303, a memory circuit 304, and a power circuit 305.

The interface circuit 301 is comprised of a capacitor 422 (C1) and an inductor 421 (L1). The interface circuit is coupled to an antenna (not shown) that receives an alternating current (AC) signal. The inductor 421 may be a matching transformer having a first coil coupled to the antenna and a second coil coupled to the capacitor 422. The received AC signal is used as a power source, and may also be used to receive commands and used to receive timing or clocking information.

The power circuit 305 comprises power supply transistors 401, 402, 403, 404 configured as diodes and arranged in a bridge configuration. The power circuit 305 is coupled to the interface circuit 301 and derives power from a signal from the antenna (not shown) and interface circuit 301. Each power supply transistor 401, 402, 403, 404 is configured to operate as a diode equivalent. The bridge configuration converts the AC signal from the antenna and interface circuit 301 to a direct current (DC) power source. The power circuit provides electrical power to circuits in the RFID device. The DC power supply lines are designated as $V_{dd}$ and Gnd in FIG. 4. Other AC to DC conversion configurations may also be used, such as an arrangement of two diodes instead of using a full-wave bridge configuration.

The memory circuit 304 is a single programmable transistor or memory device 410, configured to maintain a programmed state or to maintain a stored logic state. The programmed logic state stored in the memory device 410 is maintained with electrical power (powered) or without electrical power (un-powered) applied to the memory circuit 304. The memory device 410 may be a flash or EEPROM device having a floating gate. Generally, a floating gate transistor is programmed by selectively applying programming voltages to it, which forces an electron charge onto, or out of, the floating gate. The floating gate, surrounded by an electrical insulator holds or maintains the programmed electron charge, with or without power or with or without a voltage applied to the programmable transistor or memory device 410. Alternatively, a skilled artisan will recognize that another type of state or logic "storage" device, such as a fusible link, may be employed for the memory device 410.

The memory device 410 is programmed by applying predetermined programming voltages to the memory device 410. For example, generally, electrons may be accelerated onto the floating gate by applying a voltage that is higher than the supply voltage ($V_{dd}$) to a control gate line 411. The memory device 410 has then been programmed to be in an "off" state (non-conducting). Alternately and generally, electrons may be removed from the floating gate by applying a voltage to the control gate that is lower than the ground reference (Gnd). The memory device 410 has then been programmed to be in an "on" state (conducting). In this specific exemplary embodiment, when the memory device 410 has been programmed to operate in an "off" state, the RFID device will be deactivated, and alternatively, when the memory device 410 has been programmed to operate in an "on" state, the RFID device will be activated.

The control circuit 303 is coupled to the memory device 410. The control circuit 303 and the memory device 410 may be driven and programmed by a microprocessor (not shown), or driven and programmed by other circuits (not shown) within the RFID device. For example, a microprocessor may drive programming circuits to program the memory device 410 in response to commands received from an RFID reader (not shown). Similarly, logic within the RFID device may recognize a command sequence received from an RFID reader and trigger a programming operation.

The logic state stored in the memory device 410 indicates whether the RFID device should be activated or deactivated. The control circuit 303, using the stored logic state in the memory device 410, drives or controls the shorting circuit 302. The control circuit 303 and the memory device 410 are powered, biased, or driven by a transistor pair 405, 406. Each transistor of the transistor pair 405, 406 is configured as a diode equivalent component. The transistor pair 405, 406 is coupled to the interface circuit 301. The transistor pair 405, 406 is also coupled to a control transistor 407. The control transistor 407 is coupled to the shorting circuit 302, and the control transistor 407 drives or controls the shorting circuit 302. A bias resistor 421 is coupled to the gate of the control transistor 407.

The switching or shorting circuit 302 is configured to short circuit the power circuit 305 or configured to short circuit the interface circuit 301. A short circuit in the interface circuit 301 is applied across the capacitor 422 to dampen or halt the interface circuit 301 from oscillating. The shorting circuit is comprised of two shorting transistors 408, 409 which are coupled to the control circuit 303 and also coupled to the power circuit 305. The shorting transistors 408, 409 are generally high gain devices, for example having a wide physical layout in an integrated circuit device, to provide a fast and reliable shorting operation. When the shorting transistors 408, 409 are in a conducting state, a low impedance or short circuit is applied to the interface circuit 301 by the shorting transistors 408, 409, each in series between Vdd and opposite ends of the cap 422 and the inductor 421. The shorting transistors 408, 409 are also coupled to and short the two power supply transistors 403, 404 configured as diodes in the power circuit.

With continued reference to FIG. 4, when the RFID device is brought in close proximity to an RFID reader, a signal is generated in the antenna (not shown) and the interface circuit 301. A signal is produced at the output of the interface circuit 301 across the capacitor 422. The transistor pair 405, 406 provides a high bias and driving voltage to the control transistor 407. If the programmed or stored logic value in the memory circuit 304 causes the memory device 410 to be in an "on" state or conducting state, the gate of the control transistor 407 will be pulled to ground, turning the control transistor 407 off. When the control transistor 407 is in an off state, the shorting transistors 408, 409 will also be in an off or non-conducting state, and the RFID device is activated. The power circuit 305 will operate normally, provide power to circuits in the RFID device, and the RFID device is activated. If the programmed or stored logic value in the memory circuit 304 causes the memory device 410 to be in an "off" state or non-conducting state, the gate of the control transistor 407 will be pulled to a high state by a bias resistor 421, turning the control transistor 407 on. When the control transistor 407 is in an on state, the shorting transistors 408, 409 will be driven to an on state or conducting state. The power circuit 305 and the interface circuit 301 will be shorted or clamped, power is not provided to circuits in the RFID device, and the RFID device is deactivated.

Presented in an exemplary embodiment this invention is an RFID device that is enabled or disabled depending on the programmed state of a programmable memory device in the RFID device. Those of skill in the art will recognize that the invention can be practiced with modification and alteration within the spirit and scope of the appended claims and many other embodiments will be apparent to those of skill in the art upon reading and understanding the description presented herein. For example, equivalent circuits or methods to implement an AC to DC power circuit may be used. The combination of the control transistor, memory transistor, and (biasing) transistor pair, may be configured differently to provide the same function. The interface circuit or oscillator (LC) circuit may include a matching RF transformer tuned to the antenna or alternate active devices having capacitive or inductive characteristics may also be used. Also, the invention is not necessarily limited to specific RFID devices described. The invention may also be applied to ID cards having connectors or contacts for power and communications, or other formats. The described embodiment and its equivalents may be also used in other technology areas.

What is claimed is:

1. A circuit incorporated into an electronic identification device, the circuit comprising:
   a power circuit;
   a shorting circuit coupled to the power circuit;
   a control circuit coupled to the shorting circuit, the control circuit configured to selectively activate or deactivate the shorting circuit and correspondingly deactivate or activate the power circuit;
   a programmable memory circuit coupled to the control circuit, the programmable memory circuit configured to store at least one logical state and thereafter maintain the at least one stored logic state without an application of power from any power source, the programmable memory circuit further configured to drive the control circuit based on the at least one stored logic state; and
   wherein the control circuit comprises a driving transistor and a control transistor, the control transistor being coupled to both the driving transistor and the programmable memory device.

2. The circuit of claim 1 wherein the power circuit comprises a diode or a diode equivalent component.

3. The circuit of claim 1 wherein the power circuit converts an alternating current signal to a direct current signal.

4. The circuit of claim 1 wherein the programmable memory circuit comprises an EEPROM transistor.

5. A circuit incorporated into a contactless device, the circuit comprising:
   an antenna interface circuit;
   a power circuit coupled to the antenna interface circuit;
   a shorting circuit coupled to the antenna interface circuit;
   a control circuit coupled to the shorting circuit, the control circuit configured to selectively activate or deactivate the shorting circuit;
   a programmable memory circuit coupled to the control circuit, the programmable memory circuit configured to store at least one logical state and thereafter maintain the at least one stored logic state during a powered or unpowered condition and the programmable memory circuit further configured to drive the control circuit based on the at least one stored logic state; and
   wherein the control circuit comprises a driving transistor and a control transistor, the control transistor being coupled to both the driving transistor and the programmable memory device.

6. The circuit of claim 5 wherein the antenna interface circuit comprises an inductor and a capacitor.

7. The circuit of claim 6 wherein the power circuit comprises a diode or diode equivalent component configured in a bridge arrangement.

8. The circuit of claim 6 wherein the power circuit comprises a diode or diode equivalent component configured to convert an alternating current signal to a direct current signal.

9. The circuit of claim 5 wherein the shorting circuit comprises a switching device configured to selectively short the antenna interface circuit.

10. The circuit of claim 5 wherein the shorting circuit comprises a switching device configured to selectively short the power circuit.

11. The circuit of claim 5 wherein the programmable memory circuit comprises an EEPROM transistor having a floating gate.

12. The circuit of claim 5 wherein the contactless device is incorporated into an electronic identification device.

13. A circuit incorporated into a contactless electronic identification device, the circuit comprising:
   an oscillating circuit;
   a power circuit coupled to the oscillating circuit, the power circuit configured to convert an alternating current signal to a direct current signal;
   a shorting device coupled to the oscillating device configured to selectively short the oscillating circuit;
   a control circuit coupled to the shorting circuit, the control circuit configured to selectively activate or deactivate the shorting circuit;
   a programmable memory device coupled to the control circuit, the programmable memory device having a floating gate structure and configured to drive the control circuit based on a stored logic state; and
   wherein the control circuit comprises a driving transistor and a control transistor, the control transistor being coupled to both the driving transistor and the programmable memory device.

14. The circuit of claim 13 wherein the oscillating circuit is coupled to an antenna.

15. The circuit of claim 13 wherein the power circuit comprises a diode or diode equivalent component configured in a bridge arrangement.

16. The circuit of claim 13 wherein the power circuit comprises a diode or diode equivalent component.

17. The circuit of claim 13 wherein the programmable memory device comprises an EEPROM transistor.

18. A method to disable an electronic identification device, the method comprising:
   storing a predetermined logic state in a programmable memory device configured to maintain the stored logic state without an application of power from any power source;
   biasing a control device, a bias voltage corresponding to the stored logic state in the programmable memory device; and
   shorting a power circuit, using a driving transistor and a control transistor, selectively based on the stored logic state in the programmable memory device and the bias voltage on the control device.

19. The method of claim 18 wherein the programmable memory device comprises a memory transistor having a floating gate structure capable of storing the logic state.

20. The method of claim 18 wherein an electromagnetic signal is generated by an electronic identification device reader to generate a power source for the electronic identification device.

21. The method of claim 18 wherein the shorted power circuit comprises diodes or diode equivalent components configured in a bridge arrangement thereby providing direct current to the electronic identification device in proximity to an electronic identification reader.

22. The method of claim 18 wherein the shorted power circuit comprises a diode or diode equivalent component.

23. A contactless electronic identification device comprising:
   a means for receiving an electromagnetic signal;
   a means for deriving a power source from the electromagnetic signal;
   a means for programming and storing a logic state;

a means for maintaining the stored logic state without an application of power from any power source; and a means for selectively disabling the power source based on the stored logic state, wherein the means for selectively disabling comprises a driving transistor and a control transistor, the control transistor being coupled to both the driving transistor and the means for programming and storing.

24. The device of claim 23 wherein the received electromagnetic signal is generated by an electronic identification device reader.

25. The device of claim 23 wherein deriving a power source from the electromagnetic signal includes converting an alternating current (AC) signal into a direct current (DC) signal.

26. The device of claim 23 wherein maintaining the stored logic state without an application of power from any power source is performed by a storage memory transistor having a floating gate structure.

27. The device of claim 23 wherein selectively disabling the power source is performed by shorting the power source.

* * * * *